(12) United States Patent
Espiau et al.

(10) Patent No.: US 8,294,368 B2
(45) Date of Patent: *Oct. 23, 2012

(54) ELECTRODELESS LAMPS WITH GROUNDED COUPLING ELEMENTS

(75) Inventors: Frederick M. Espiau, Topanga, CA (US); Mehran Matloubian, Encino, CA (US); Timothy J. Brockett, Oakland, CA (US); David Schmelzer, Santa Monica, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/818,984

(22) Filed: Jun. 18, 2010

(65) Prior Publication Data

US 2010/0320906 A1    Dec. 23, 2010

Related U.S. Application Data

(63) Continuation-in-part of application No. 12/685,650, filed on Jan. 11, 2010, which is a continuation-in-part of application No. 12/484,933, filed on Jun. 15, 2009, now Pat. No. 7,830,092.

(60) Provisional application No. 61/075,735, filed on Jun. 25, 2008.

(51) Int. Cl.
   *H01J 7/46* (2006.01)
(52) U.S. Cl. .......................... 315/39; 315/248
(58) Field of Classification Search ............ 315/39, 315/39.51, 248; 313/231.31, 231.61
See application file for complete search history.

(56) References Cited

U.S. PATENT DOCUMENTS

| | | | |
|---|---|---|---|
| 3,943,404 A * | 3/1976 | McNeill et al. | 315/248 |
| 4,001,632 A * | 1/1977 | Haugsjaa et al. | 315/39 |
| 4,185,228 A * | 1/1980 | Regan | 315/39 |
| 4,975,655 A | 12/1990 | Dawson et al. | |
| 5,637,963 A | 6/1997 | Inoue et al. | |
| 5,686,793 A | 11/1997 | Turner et al. | |
| 5,757,130 A * | 5/1998 | Dolan et al. | 313/574 |
| 5,777,857 A | 7/1998 | Degelmann | |
| 5,834,895 A | 11/1998 | Dolan et al. | |
| 5,838,108 A | 11/1998 | Frank et al. | |
| 5,852,339 A * | 12/1998 | Hamilton et al. | 315/248 |
| 5,886,480 A | 3/1999 | Penzenstadler et al. | |
| 5,923,122 A | 7/1999 | Frank et al. | |
| 6,137,237 A | 10/2000 | MacLennan et al. | |
| 6,241,369 B1 | 6/2001 | Mackiewicz | |

(Continued)

OTHER PUBLICATIONS

Bogaerts, et al., "Gas Discharge Plasmas and their Applications," Spectrochimica Acta, Part B 57, 2002, pp. 609-658.

(Continued)

*Primary Examiner* — Jacob Y Choi
*Assistant Examiner* — Ephrem Alemu
(74) *Attorney, Agent, or Firm* — Kilpatrick Townsend & Stockton LLP

(57) ABSTRACT

An electrodeless plasma lamp includes a bulb containing a gas-fill and light emitter(s) excited to produce light using radio-frequency (RF) energy. Input and output coupling elements separated from each other by a gap couple RF energy from an RF source to the bulb. One end of the input coupling element is electrically connected to an RF source while the other end is connected to ground. One end of the output coupling element is connected to ground while the other end is connected to the bulb.

20 Claims, 20 Drawing Sheets

U.S. PATENT DOCUMENTS

| | | | |
|---|---|---|---|
| 6,617,806 B2 | 9/2003 | Kirkpatrick et al. | |
| 6,737,809 B2 | 5/2004 | Espiau et al. | |
| 6,856,092 B2* | 2/2005 | Pothoven et al. | 313/634 |
| 6,922,021 B2 | 7/2005 | Espiau et al. | |
| 7,119,641 B2 | 10/2006 | Petrov et al. | |
| 7,291,785 B2 | 11/2007 | Riester et al. | |
| 7,348,732 B2 | 3/2008 | Espiau et al. | |
| 7,350,936 B2 | 4/2008 | Ducharme et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,719,195 B2 | 5/2010 | DeVincentis et al. | |
| 7,830,092 B2 | 11/2010 | Espiau et al. | |
| 2005/0094940 A1* | 5/2005 | Gao | 385/39 |
| 2005/0212456 A1* | 9/2005 | Espiau et al. | 315/248 |
| 2006/0250090 A9 | 11/2006 | Guthrie | |
| 2008/0054813 A1 | 3/2008 | Espiau et al. | |

OTHER PUBLICATIONS

International Search Report and Written Opinion of PCT Application No. PCT/US09/048174, mailed on Aug. 17, 2009, 17 pages total.

Notice of Allowance for U.S. Appl. No. 12/484,933, mailed on Jul. 23, 2010, 6 pages.

* cited by examiner

ELECTRODELESS LAMPS WITH GROUNDED COUPLING ELEMENTS

CROSS REFERENCE TO RELATED APPLICATIONS

This patent application is a continuation-in-part of U.S. Ser. No. 12/685,650, filed Jan. 11, 2010, which is a continuation-in-part of U.S. Ser. No. 12/484,933 filed Jun. 15, 2009, which claims priority to U.S. Provisional Application No. 61/075,735, filed Jun. 25, 2008, commonly assigned, all of which applications are hereby incorporated by reference.

BACKGROUND OF THE INVENTION

This invention is directed to devices and methods for generating light with plasma lamps. More particularly, the present invention provides a plasma lamp driven by a radio-frequency source without the use of electrodes inside the bulb. Such plasma lamps can be applied to lighting applications for stadiums, parking lots, military and defense, streets, buildings, vehicle headlamps, aircraft landing lights, bridges, uv water treatment, agriculture, architectural lighting, stage lighting, medical illumination, microscopes, projectors and displays, as well as other uses.

Plasma lamps provide extremely bright, broadband light, and are useful in many applications, such as general illumination, projection systems, and industrial processing. The typical plasma lamp manufactured today contains a mixture of gas and trace substances that are excited to form a plasma using a high current passed through closely-contacting electrodes. This arrangement, however, suffers from deterioration of the electrodes inside the bulb, and therefore a limited lifetime. Other limitations also exist with conventional plasma lamps.

From the above, it is seen that techniques for improving plasma lamps are highly desirable.

BRIEF SUMMARY OF THE INVENTION

According to the present invention, techniques directed to devices and methods for generating light with plasma lamps are provided. More particularly, the present invention provides plasma lamps driven by a radio-frequency source without the use of electrodes inside the gas filled vessel (bulb). In one implementation, the radio-frequency source is coupled to the gas filled vessel using a compact air resonator/waveguide with grounded coupling elements. In some embodiments, the resonator/waveguide is not made using, and is generally free from a dielectric material, such as alumina or quartz. In addition the arc of the gas filled vessel (bulb) is not substantially surrounded by the body of the resonator/waveguide, thus allowing the use of reflectors and other optical components used in designing luminaires. The gas filled vessel is includes the arc, which is substantially free from any mechanical blockage by the body of the resonator waveguide, which allows the use of reflectors and other optical components.

In a specific embodiment, the present invention provides an electrodeless plasma lamp. The lamp includes an input coupling element and an output coupling element. One end of the input coupling element is electrically connected to the output of an RF source. The RF source consists of an RF oscillator and one or more stages of amplifiers, or it can consist of a high power oscillator. The other end of the input coupling element is electrically connected to ground (or is at RF ground potential). One end of the output coupling element is also connected to ground, or is at RF ground potential, and the other end of the output coupling element is connected to the gas filled vessel. A gap between the input coupling element and output coupling element provides for application of RF energy. By adjusting the dimensions of the input and output coupling elements and the gap between them, one can maximize the RF energy coupled to the bulb. The coupling elements can be surrounded by a conductive enclosure (lamp body) having a surface at ground potential. The inside of the enclosure is filled with air, other gases, or alternatively is in vacuum.

In a preferred embodiment a substantial portion of the bulb extends outside the enclosure through a hole in the enclosure. RF energy couples to the bulb capacitively, or inductively, or a combination of capacitively and inductively. RF energy ionizes the gas inside the bulb and vaporizes the light emitter (s) resulting in electromagnetic radiation from the bulb in the visible, ultraviolet and/or infrared spectrum. The lamp may further include a reflector to direct the luminous output of the bulb. The lamp further may include a ground strap to conductively connect to, or be coupled to, the top of the bulb and the conductive lamp body. Alternatively, the ground strap may conductively connect the top of the bulb-coupling element assembly to the reflector, which in turn is conductively connected to the lamp body.

In another embodiment, the lamp body comprises a metallic conductive body partially filled with a dielectric insert. The dielectric insert may be a single material, layered, a composite, or other suitable spatial configurations and/or materials. Alternatively, the lamp body can be filled with a dielectric material such as alumina. In some embodiments, the dielectric fill material comprises alumina. In some embodiments, the dielectric fill material comprises at least silicon dioxide or quartz. In some embodiments, the dielectric fill material comprises silicon nitride.

In a specific embodiment, the present invention provides an alternative electrodeless plasma lamp. The lamp includes a gas filled vessel (bulb), an input coupling element and an output coupling element separated from the input coupling element by a gap. The gas filled vessel having a transparent or translucent body configured by an inner region and an outer surface region with a cavity being defined within the inner region. The gas filled vessel typically contains an inert gas such as Argon or Xenon (or combination of inert gases) and one or more light emitters such as Mercury, Indium Bromide, Sulfur, Cesium Bromide, or other elements. One end of the output coupling element is connected to the gas filled vessel and the other end of the output coupling element is electrically connected to ground or to a conductive enclosure surrounding the coupling elements (lamp enclosure) which is at ground potential. The input coupling element couples RF energy to the output coupling element. One end of the input coupling element is electrically connected to an RF source, including an oscillator and an amplifier. The other end of the input coupling element is connected to ground or to the conductive enclosure surrounding the coupling elements (lamp enclosure) which is at ground potential. The dimensions of the input and output coupling elements and the gap between them can be adjusted to optimize RF energy transfer between the RF source and the gas filled vessel. RF energy ionizes the gas inside the bulb and vaporizes the light emitter(s) resulting in electromagnetic radiation from the bulb in the visible and/or ultra violet and/or infrared part of the spectrum.

The present lamp is compact and can be configured inside conventional luminaires, such as luminaires used for street lighting and parking lot lighting. Furthermore, the lamp can be configured to have an exposed arc to allow use of conventional optical components, such as aluminum reflectors. The present lamp can also be manufactured more efficiently and at lower cost than the conventional dielectric resonators, such as those described in U.S. Pat. No. 6,737,809B2. That is, the electrodeless lamp with grounded coupling elements is significantly lower in cost and simpler to manufacture since it does not require precise control of the depth of probes. Furthermore, the lamp can be configured to have an exposed arc to allow use of conventional optical components. Further details of the present invention can be found throughout the specification below. The present invention achieves these benefits and others in the context of known process technology.

BRIEF DESCRIPTION OF THE DRAWINGS

A more complete understanding of the present invention and its advantages will be gained from a consideration of the following description of preferred embodiments, read in conjunction with the accompanying drawings. In the figures and description, numerals indicate various features of the invention, and like numerals referring to like features throughout both the drawings and the description.

DETAILED DESCRIPTION OF THE INVENTION

Figure 1A:
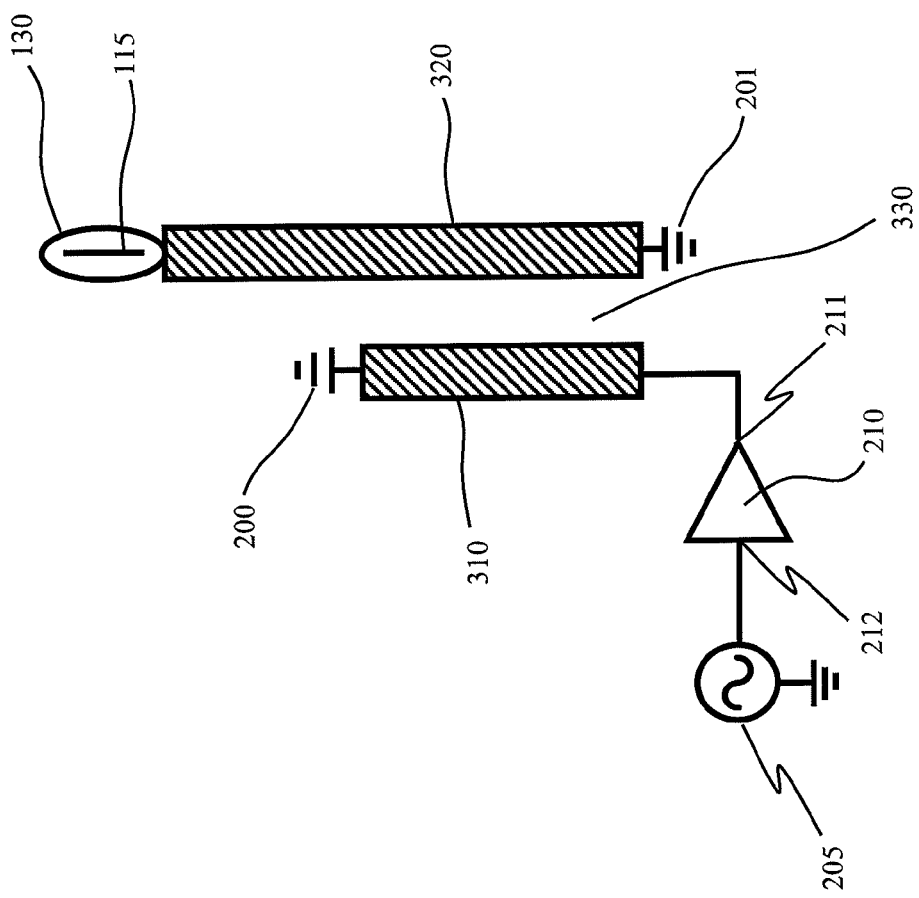
FIG. 1A is a simplified drawing of an embodiment of the present invention with one end of the input transmission line (input coupling element) connected to an RF source while the other end of the input transmission line is electrically connected to ground. The input transmission line couples RF energy to the output transmission line (output coupling element) that is electrically connected to ground on one end of the output transmission line and couples the RF energy to the gas filled vessel (bulb) at the other end.

According to the present invention, techniques directed to devices and methods for generating light with plasma lamps are provided. More particularly, the present invention provides plasma lamps driven by a radio-frequency source without the use of electrodes inside a gas-filled vessel.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

As background for the reader, we would like to describe conventional lamps and their limitations that we discovered. Electrodeless plasma lamps driven by microwave sources have been proposed. Conventional configurations include a gas filled vessel (bulb) containing Argon and a light emitter such as Sulfur or Cesium Bromide (see for example, U.S. Pat. No. 6,476,557B1). The bulb is positioned inside an air resonator/waveguide with the microwave energy provided by a source such as a magnetron and introduced into the resonator/waveguide to heat and ionize the Argon gas and vaporize the Sulfur to emit light. To use RF sources that are efficient and low-cost it is desirable to design the resonator/waveguide to operate at frequencies below approximately 2.5 GHz and preferably below 1 GHz. A conventional air resonator/waveguide operating in the fundamental resonant mode of the resonator at 1 GHz has at least one dimension that is approximately 15 cm long since this length is about half the free-space wavelength (lambda/2) of the resonant frequency of the resonator. This results in limitations that were discovered. Such limitations include a resonator/waveguide size that is too large for most commercial lighting applications since the resonator/waveguide will not fit within typical lighting fixtures (luminaires). In addition since the bulb was placed inside the air/resonator cavity, the arc of the bulb is not accessible for use in the design of reflectors for various types of luminaires used in commercial and industrial lighting applications.

In the configuration proposed in U.S. Pat. No. 6,737,809B2, Espiau, et al., the air inside the resonator is replaced with alumina resulting in reducing the size of the resonator/waveguide since the free-space wavelength (fundamental mode guided wavelength for this resonator/waveguide) is now reduced approximately by the square-root of the effective dielectric constant of the resonator body. This approach has some advantages over the air resonator in U.S. Pat. No. 6,476,557B1 by reducing the size of the resonator but it has its own drawbacks. Such drawbacks may include higher manufacturing costs, losses associated with the dielectric material, and blockage of light from the bulb by the dielectric material. In this approach, the arc of the bulb is not accessible either limiting its use in various types of luminaires used in commercial and industrial lighting applications.

FIG. 1A is a simplified drawing of an embodiment of the present invention with one end of the input transmission line (input coupling element) 310 made from an electrically conductive material such as Copper is connected to an RF source while the other end of the input transmission line is electrically connected to ground 200. The RF source consists of an oscillator 205 and an RF amplifier 210 with the output of the oscillator connected to the input 212 of the RF amplifier 210 and the output of the amplifier 211 is conductively connected to the input coupling element 310. The amplifier can consist of multiple stages of amplification. The input coupling element is separated from the output transmission line (output coupling element) 320, which is also made from an electrically conductive material such as Copper, by a coupling gap 330. The output coupling element is electrically connected to ground 201 at one end and is connected to the gas filled vessel 130 which contains the plasma arc 115 at the other end. The input transmission line couples RF energy to the output transmission line which in turn couples the RF energy to the gas filled vessel (bulb) capacitively, inductively, or combination of capacitively and inductively. By adjusting the dimensions of the input and output coupling elements as well as the gap between them one can maximize the transfer of the RF power between the RF source and the bulb. The bulb is made of a suitable material such as quartz or translucent alumina or other transparent or translucent material. The bulb is filled with an inert gas such as Argon or Xenon and a light emitter such as Mercury, Sodium, Dysprosium, Sulfur or a metal halide salt such as Indium Bromide, Scandium Bromide, Thallium Iodide, Holmium Bromide, Cesium Iodide or other similar materials (or it can simultaneously contain multiple light emitters). RF energy is coupled capacitively, or inductively, or a combination of inductively and capacitively, by the output coupling-element 320 to the bulb 130, ionizing the inert gas and vaporizing the light emitter(s) resulting in intense light emitted from the lamp. The majority of the arc of the bulb 115 is not blocked by the coupling element allowing efficient light collection by reflectors. Even though a microstrip type transmission line is shown in FIG. 1A other types of RF transmission lines can be used. The transmission lines can be inside a conductive enclosure and can also be integrated as part of the amplifier circuit. This diagram is merely example, which should not unduly limit the scope of the claims herein. One of ordinary skill in the art would recognize other variations, alternatives, and modifications.

Figure 1B:
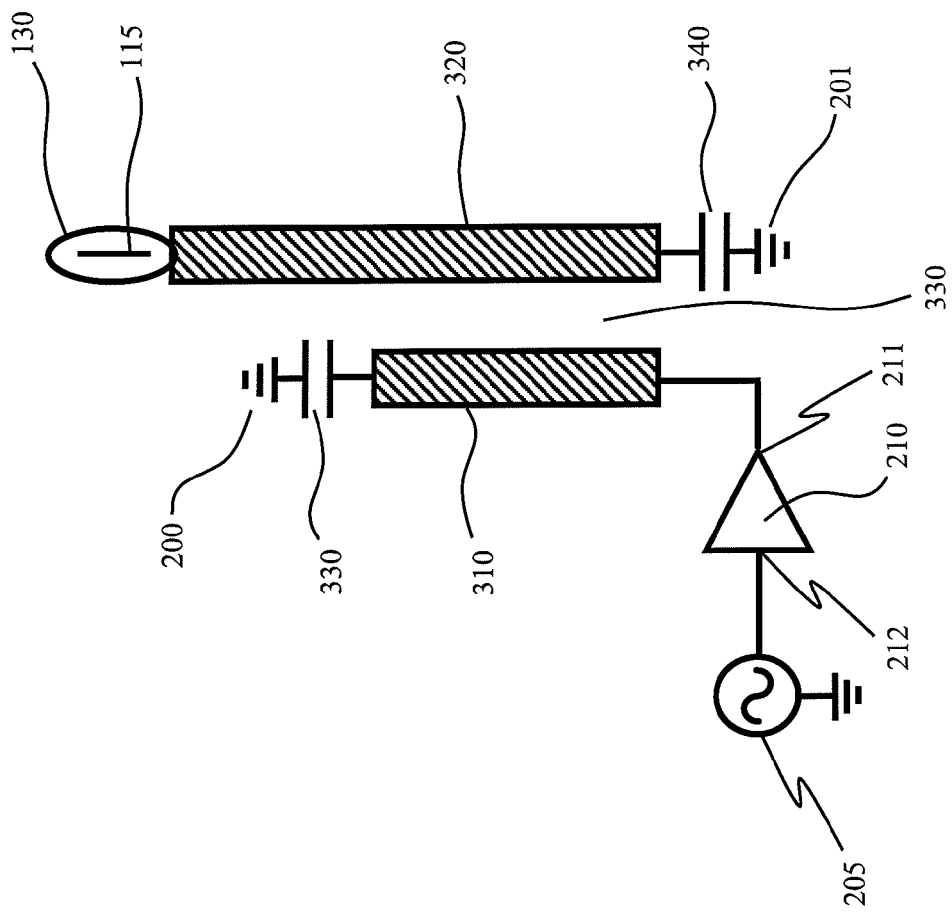
FIG. 1B is a simplified drawing of an embodiment of the present invention similar to the one shown in FIG. 1A. In this embodiment the input transmission line (input coupling element) and the output transmission line (output coupling element) are electrically connected to ground through capacitors. The capacitors are selected to provide a low impedance connection to ground at the frequency of the RF source. The capacitors provide an open circuit at DC.

FIG. 1B is a simplified drawing of an embodiment of the present invention similar to the one shown in FIG. 1A. In this embodiment the input transmission line (input coupling element) 310 and the output transmission line (output coupling element) 320 are electrically connected to ground 200 and 201 through capacitors 330 and 340 respectively. The capacitors 330 and 340 are selected to provide a low impedance connection to ground at the frequency of the RF source. The capacitors provide an open circuit at DC.

Figure 2A:
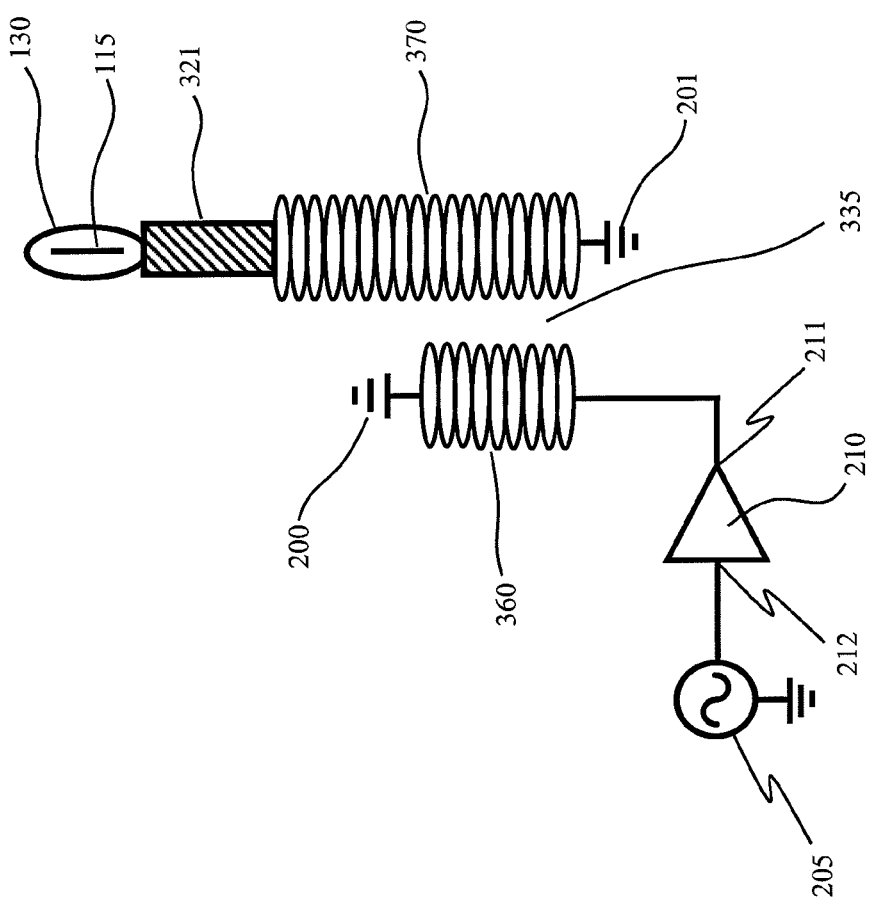
FIG. 2A is a simplified drawing of another embodiment of the present invention. It is similar to the one shown in FIG. 1A except that the input transmission line (input coupling element) and part of the output transmission line (output coupling element) are replaced by spiral inductors.

FIG. 2A is a simplified drawing of another embodiment of the present invention. It is similar to the one shown in FIG. 1A except that the input transmission line (input coupling element) 310 is replaced by a spiral inductor 360. One end of the spiral inductor 360 is electrically connected to the output 211 of the RF power 210 and the other end of the spiral inductor is connected to ground 200. An oscillator 205 is connected to the input 212 of the RF power amplifier. The amplifier can consist of multiple stages of amplification. Part of the output transmission line (output coupling element) 320 is also replaced by a spiral inductor 370. One end of the spiral inductor (part of the output coupling element) 370 is electrically connected to ground 201 while the other end is connected to transmission line 321 (also part of output coupling element). The transmission line 321 is connected on one end to spiral inductor 370 and on the other end it is connected to the gas filled vessel 130 which contains the plasma arc 115. The input coupling element 360 couples RF energy to the output coupling elements 370 and 321 which in turn couple the RF energy to the gas filled vessel (bulb) capacitively, inductively, or combination of capacitively and inductively. By adjusting the dimensions (diameter, length, number of turns, etc. of the spiral inductors) of the input and output coupling elements as well as the gap 335 between them one can maximize the transfer of the RF power between the RF source and the bulb.

Figure 2B:
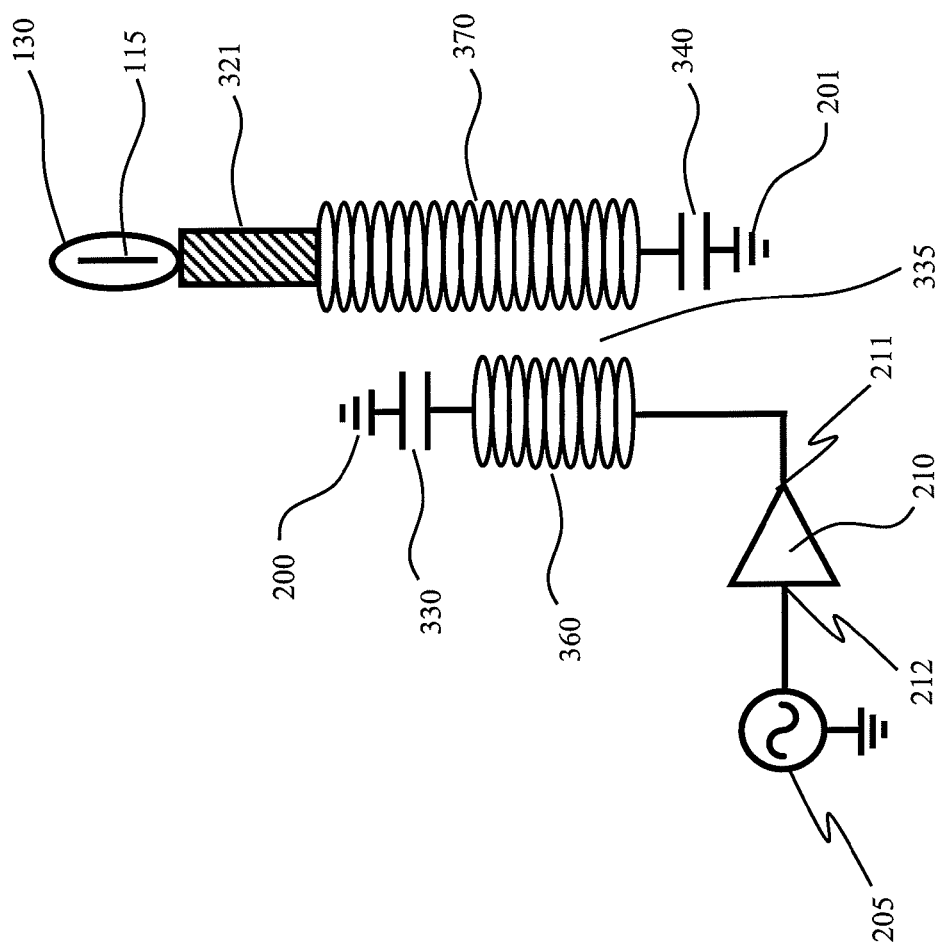
FIG. 2B is a simplified drawing of another embodiment of the present invention. It is similar to the one shown in FIG. 2A except that the input coupling element and the output coupling element are electrically connected to ground through capacitors. The capacitors are selected to provide a low impedance connection to ground at the frequency of the RF source. The capacitors provide an open circuit at DC.

FIG. 2B is a simplified drawing of another embodiment of the present invention similar to the one shown in FIG. 2A. In this embodiment the input spiral inductor (input coupling element) 360 and the output spiral inductor 370 and transmission line 321 (output coupling elements) are electrically connected to ground 200 and 201 through capacitors 330 and 340 respectively. The capacitors 330 and 340 are selected to provide a low impedance connection to ground at the frequency of the RF source. The capacitors provide an open circuit at DC.

Figure 2C:
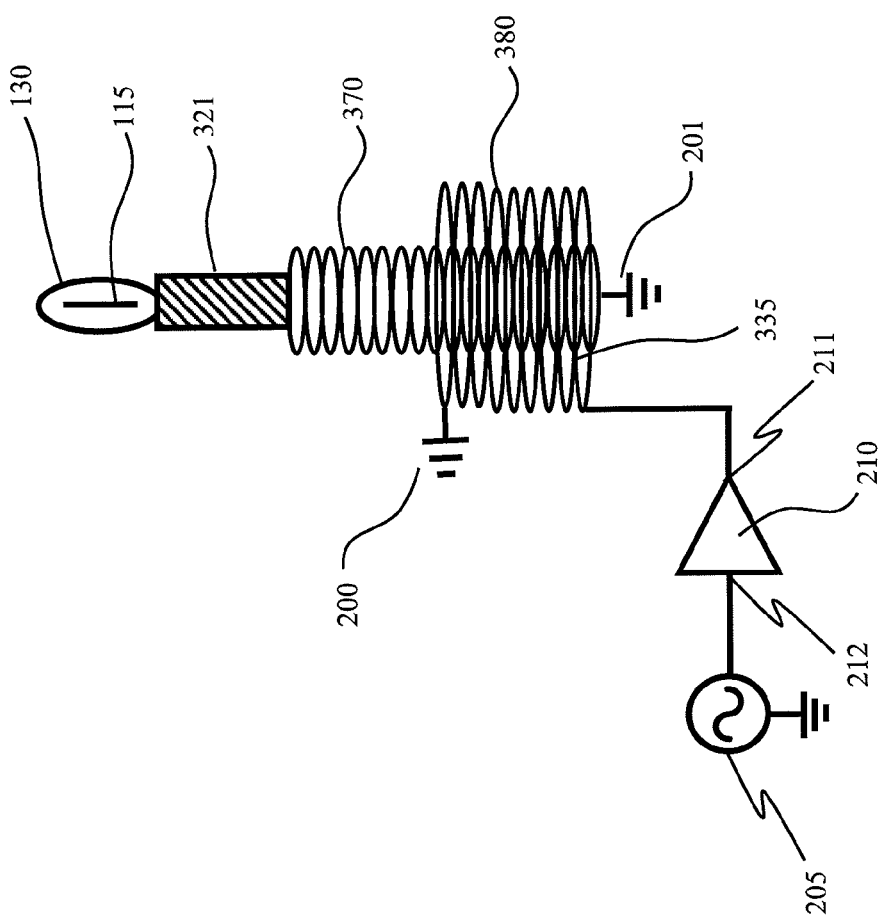
FIG. 2C is a simplified drawing of another embodiment of the present invention. It is similar to the one shown in FIG. 2A except that the input coupling element (spiral inductor) couples RF energy to the output coupling element (spiral inductor) by wrapping around it.

FIG. 2C is a simplified drawing of another embodiment of the present invention. It is similar to the one shown in FIG. 2A except that the input coupling element (spiral inductor) 380 couples RF energy to the output coupling element (spiral inductor) 370 by wrapping around it. By adjusting the dimensions (diameter, length, number of turns, etc. of the spiral inductors) of the input and output coupling elements as well as the overlap and spacing between them one can maximize the transfer of the RF power between the RF source and the bulb.

Figure 3B:
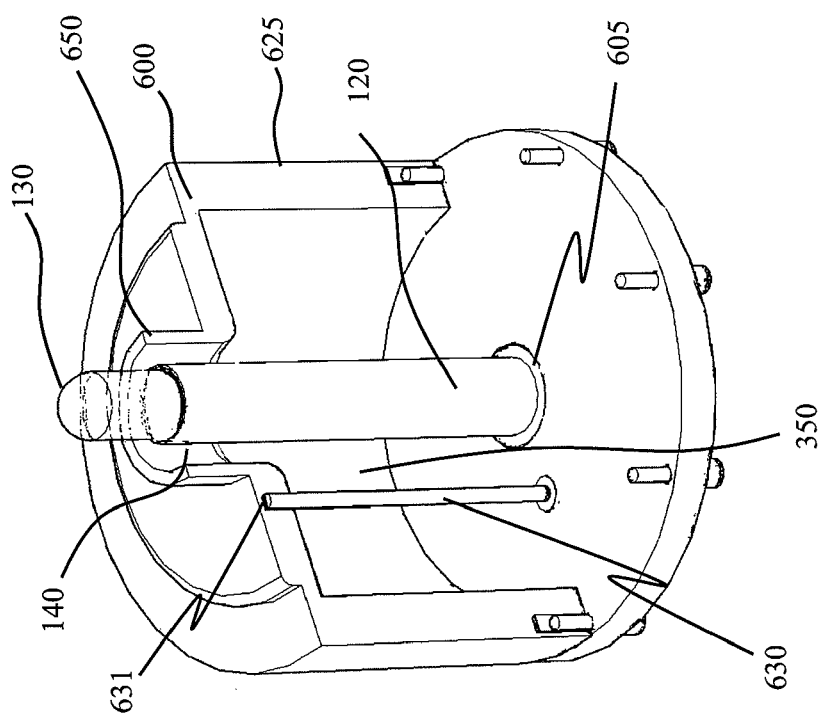
FIG. 3B is a cross-sectional perspective view of the lamp in FIG. 3A without the RF source. It illustrates the input and output coupling element with a coupling gap between them.
Figure 3A:
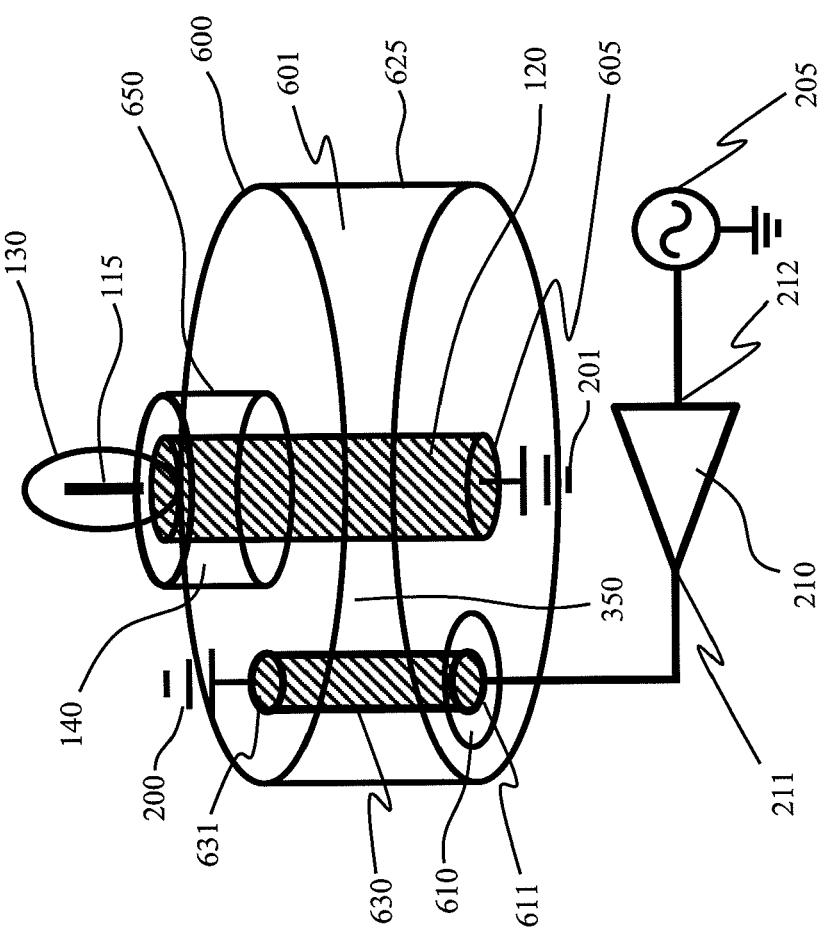
FIG. 3A is a simplified perspective view of another embodiment of the present invention. The input coupling element is connected to an RF source at one end and the other end of the coupling element is electrically connected to ground. The input coupling element couples RF energy to an output coupling element that is electrically connected at one end to the ground and the other end couples RF energy to gas filled vessel (bulb).

FIG. 3A is a simplified perspective view of another embodiment of the present invention. This diagram is merely example, which should not unduly limit the scope of the claims herein. One of ordinary skill in the art would recognize other variations, alternatives, and modifications. The lamp consists of a lamp housing 600 made from an electrically conductive material that surrounds the input and output coupling elements. This conductivity may be achieved through the application of a conductive veneer, or through the choice of a conductive material. An example embodiment of conductive veneer is silver paint or alternatively the lamp body can be made from sheet of electrically conductive material such as Aluminum. In this embodiment the lamp body consists of a wider diameter bottom section 625 and a narrower diameter 650 top section and is filled with air 601 or other gases such as Nitrogen or fluids, or can be a vacuum. A cylindrical lamp body is depicted, but rectangular or other shapes may be used. The input coupling element 630 is connected to the lamp body at the top surface 631 (which is at ground potential 200) and at the other end is connected to an RF connector 611 through an opening in the lamp body 610. The input coupling element 630 can be made from a solid or hollow conductor or alternatively from a dielectric material with an electrically conductive coating. The RF source consists of an oscillator 205 electrically connected to the input 212 of the power amplifier 210 and the output of the power amplifier 211 is electrically connected to RF connector 611. The amplifier can consist of multiple stages of amplification. The input coupling element 630 couples RF energy to the output coupling element 120 and the two coupling elements are separated by a coupling gap 350. The output coupling element 120 is connected to the lamp body at the bottom 605 (which is at ground potential 201) and at the other end is connected to the gas filled vessel (bulb) 130. The output coupling element can be made from solid or hollow electrically conductive material or alternatively can be made from a dielectric material with an electrically conductive coating. The top end of the output coupling element is shaped to closely receive the gas filled vessel. In the case that the output coupling element is made from a solid conductor a thin layer of a dielectric material or refractory metal is used as an interface barrier between the bulb and the output coupling element. The output coupling element is separated from the top portion of the lamp body 650 by a gap 140. By adjusting the dimensions of the input and output coupling elements as well as the dimensions of the lamp body including the size of the gaps 350 and 140, one can maximize the transfer of the RF power between the RF source and the bulb. In a specific embodiment, the gas filled vessel is made of a suitable material such as quartz or translucent alumina or other transparent or translucent material. The gas filled vessel is filled with an inert gas such as Argon or Xenon and a light emitter such as Mercury, Sodium, Dysprosium, Sulfur or a metal halide salt such as Indium Bromide, Scandium Bromide, Thallium Iodide, Holmium Bromide, Cesium Iodide or other similar materials (or it can simultaneously contain multiple light emitters). RF energy is coupled capacitively, or inductively, or a combination of inductively and capacitively, by the output coupling-element 120 to the bulb 130, ionizing the inert gas and vaporizing the light emitter(s) resulting in intense light emitted from the lamp. The majority of the arc of the bulb 115 in this embodiment is not surrounded by the walls of the lamp body.

In one example embodiment, the bottom 625 of the lamp body 600 may consist of a hollow aluminum cylinder with a 5 cm diameter, and a height of 3.8 cm and the top portion 650 has a diameter of 1.6 cm and a height of 1.4 cm. The diameter of the input coupling element 630 is about 0.13 cm and the diameter of the output coupling element 120 is about 0.92 cm. The fundamental resonant frequency of such lamp body is approximately 900 MHz. By adjusting the various design parameters (dimensions of the lamp body, length and diameter of the output coupling element, gap between the input and output coupling element, gap between the output coupling element and the walls of the lamp body) as well as other parameters it is possible to achieve different resonant frequencies. Also it is possible by adjusting various design parameters to have numerous other design possibilities for a 900 MHz resonator. One significant advantage of the invention is that the input coupling element 630 and the output coupling element 120 are respectively grounded at planes 631 and 605, which are coincident with the outer surface of the lamp body 600. This eliminates the need to fine-tune their depth of insertion into the lamp body—as well as any sensitivity of the RF coupling between them to that depth—simplifying lamp manufacture, as well as improving consistency in lamp brightness yield. This illustration is merely an example, which should not unduly limit the scope of the claims herein. One of ordinary skill in the art would recognize other variations, modifications, and alternatives.

FIG. 3B is a cross-sectional perspective view of the lamp in FIG. 3A without the RF source. The input coupling element 630 is shown connected to the top surface 631 of the conductive lamp body 600. The output coupling element 120 in this case is made from a solid conductor and is screwed into the bottom of the conductive lamp body 605. Other attachment methods such as using set screws is possible for connecting the output coupling element to the lamp body. By optimizing the gap 140 between the output coupling element 120 and the lamp body 650, and the gap 350 between input coupling element 630 and output coupling element 120, as well as the dimensions of the input and output coupling elements and the lamp body one can maximize the transfer of the RF power between the RF source and the bulb 130. This illustration is merely an example, which should not unduly limit the scope of the claims herein. One of ordinary skill in the art would recognize other variations, modifications, and alternatives.

Figure 4A:
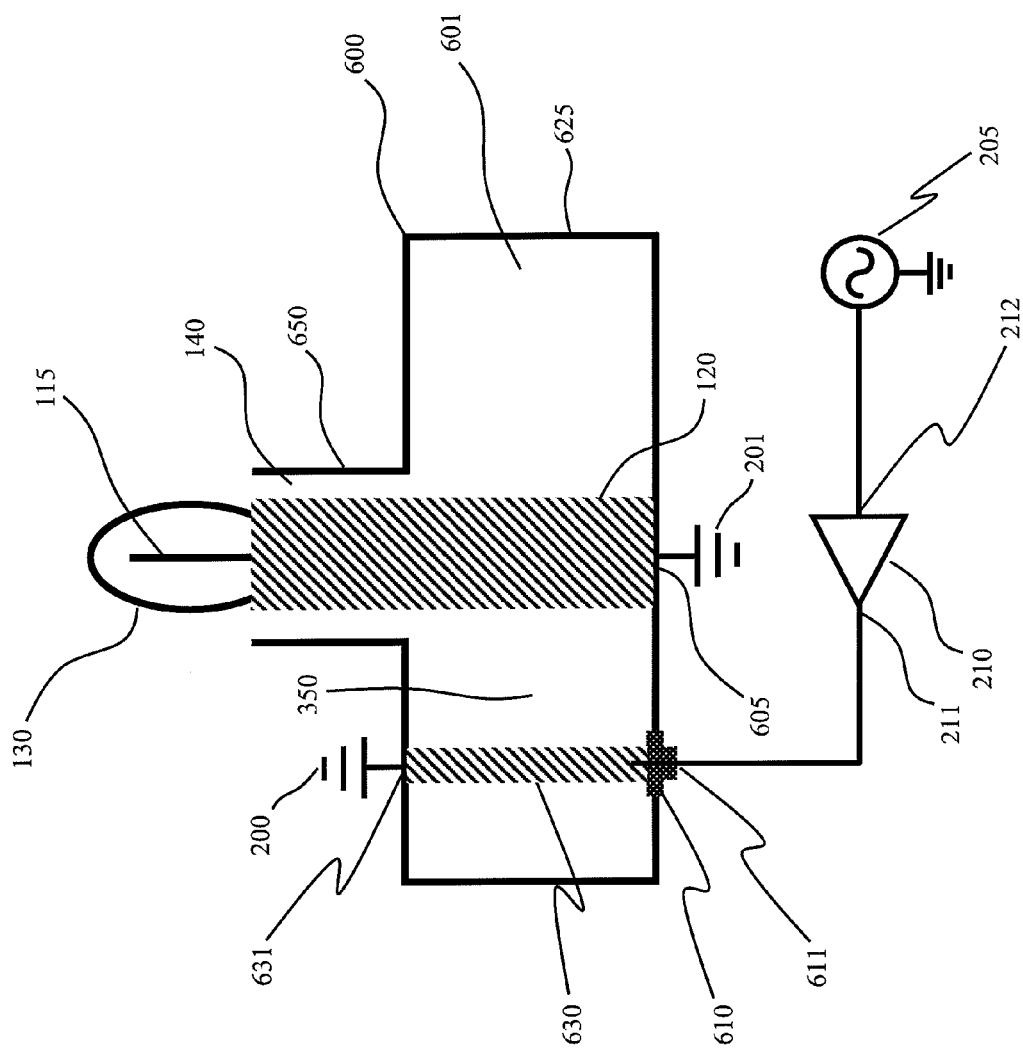
FIG. 4A is a simplified cross-sectional view of the embodiment shown in FIG. 3A.

FIG. 4A is a simplified cross-sectional view of the embodiment shown in FIG. 3A. The input coupling element 630 is connected to the lamp body at the top surface 631 (which is at ground potential 200) and at the other end is connected to an RF connector 611 through an opening in the lamp body 610. The RF source consists of an oscillator 205 electrically connected to the input 212 of the power amplifier 210 and the output of the power amplifier 211 is electrically connected to RF connector 611. The amplifier can consist of multiple stages of amplification. The input coupling element 630 couples RF energy to the output coupling element 120 and the two coupling elements are separated by a coupling gap 350. The output coupling element 120 is connected to the lamp body at the bottom 605 (which is at ground potential 201) and at the other end is connected to the gas filled vessel (bulb) 130. The top end of the output coupling element is shaped to closely receive the gas filled vessel. In the case that the output coupling element is made from a solid conductor a thin layer of a dielectric material or refractory metal is used as an interface barrier between the bulb and the output coupling element. The output coupling element is separated from the top portion of the lamp body 650 by a gap 140. By adjusting the dimensions of the input and output coupling elements as well as the dimensions of the lamp body including the size of the gaps 350 and 140, one can maximize the transfer of the RF power between the RF source and the bulb. The bulb is made of a suitable material such as quartz or translucent alumina or other transparent or translucent material. The bulb is filled with an inert gas such as Argon or Xenon and a light emitter such as Mercury, Sodium, Dysprosium, Sulfur or a metal halide salt such as Indium Bromide, Scandium Bromide, Thallium Iodide, Holmium Bromide, Cesium Iodide or other similar materials (or it can simultaneously contain multiple light emitters). RF energy is coupled capacitively, or inductively, or a combination of inductively and capacitively, by the output coupling-element 120 to the bulb 130, ionizing the inert gas and vaporizing the light emitter(s) resulting in intense light emitted from the lamp. The majority of the arc of the bulb 115 in this embodiment is not surrounded by the walls of the lamp body.

Figure 4B:
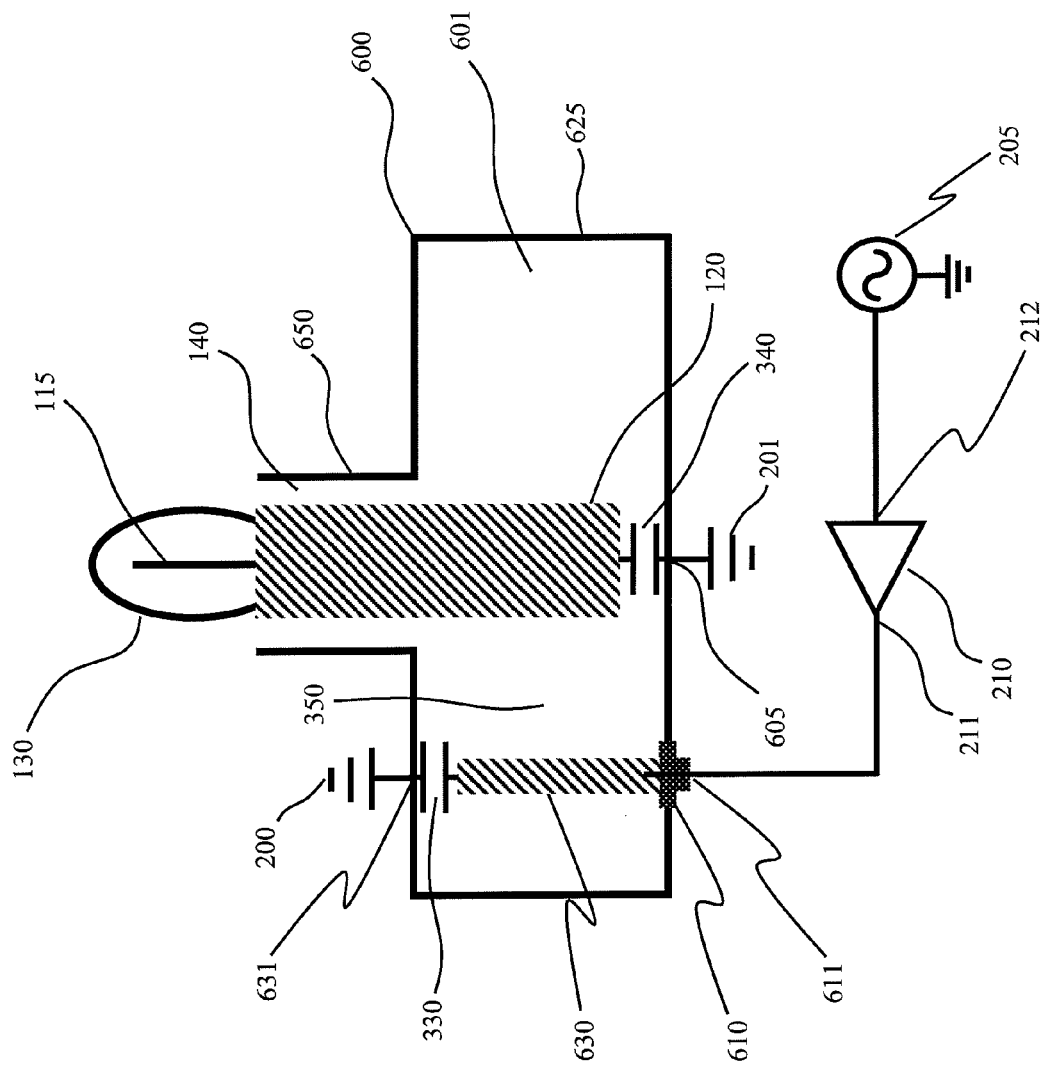
FIG. 4B is a simplified drawing of another embodiment of the present invention. It is similar to the embodiment shown in FIG. 4A except that the input coupling element and output coupling elements are electrically connected to ground through capacitors. The capacitors are selected to provide low impedance connections to ground at the frequency of the RF source. The capacitors provide an open circuit at DC.

FIG. 4B is a simplified drawing of another embodiment of the present invention similar to the one shown in FIG. 4A. In this embodiment the input coupling element 630 and the output coupling element 120 are electrically connected to ground 200 and 201 through capacitors 330 and 340 respectively. The capacitors 330 and 340 are selected to provide low impedance connections to ground at the frequency of the RF source. The capacitors provide an open circuit at DC.

Figure 4C:
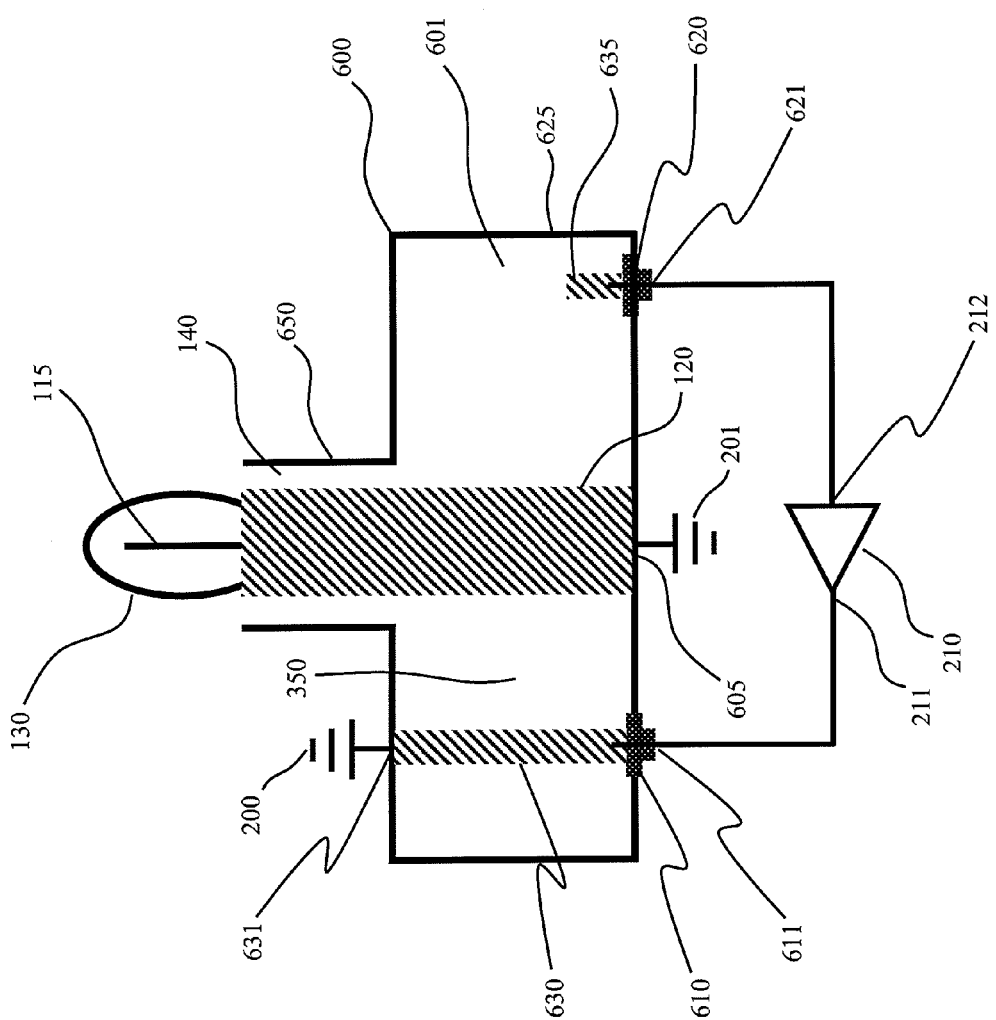
FIG. 4C illustrates another embodiment of the invention shown in FIG. 4A. In this embodiment a feedback coupling element is added and an amplifier connected between the feedback coupling element and the input coupling element providing for frequency selective oscillation in the feedback loop.

FIG. 4C illustrates another embodiment of the invention shown in FIG. 4A. In this embodiment instead of using an oscillator 205 as the RF source, a feedback coupling element 635 is added. The feedback coupling element 635 is closely received by the lamp body 600 through opening 620 and as such is not in direct DC electrical contact with the conductive surface of the lamp body. The shorter feedback coupling element couples a small amount of RF energy from the lamp body and provides feedback to the input 212 of an RF power amplifier 210 through an RF connector 621. The output 211 of the RF power amplifier 210 is electrically connected to the input coupling element 630 through RF connector 611. Input coupling element 630 is closely received by the lamp body 600 through the opening 610 and as such is not in direct electrical contact with the lamp body at the bottom surface. However, the other end of the input coupling element is connected to the lamp body 600 at 631 (which is at ground potential 200). The feedback loop between the feedback coupling element, the RF amplifier, the input coupling element, and the lamp body results in oscillation as long as the amplifier has gain at the resonant frequency of the lamp body that is larger than the feedback loop losses and the phase of the feedback loop satisfies steady state oscillation conditions. The RF power from the amplifier is coupled to the output coupling element 120 by the input coupling element. The output coupling element couples the RF energy to the bulb resulting in ionization of the inert gas followed by vaporization of the light emitter(s) which then results in light emission from the bulb. This diagram is merely example, which should not unduly limit the scope of the claims herein. One of ordinary skill in the art would recognize other variations, alternatives, and modifications.

Figure 4D:
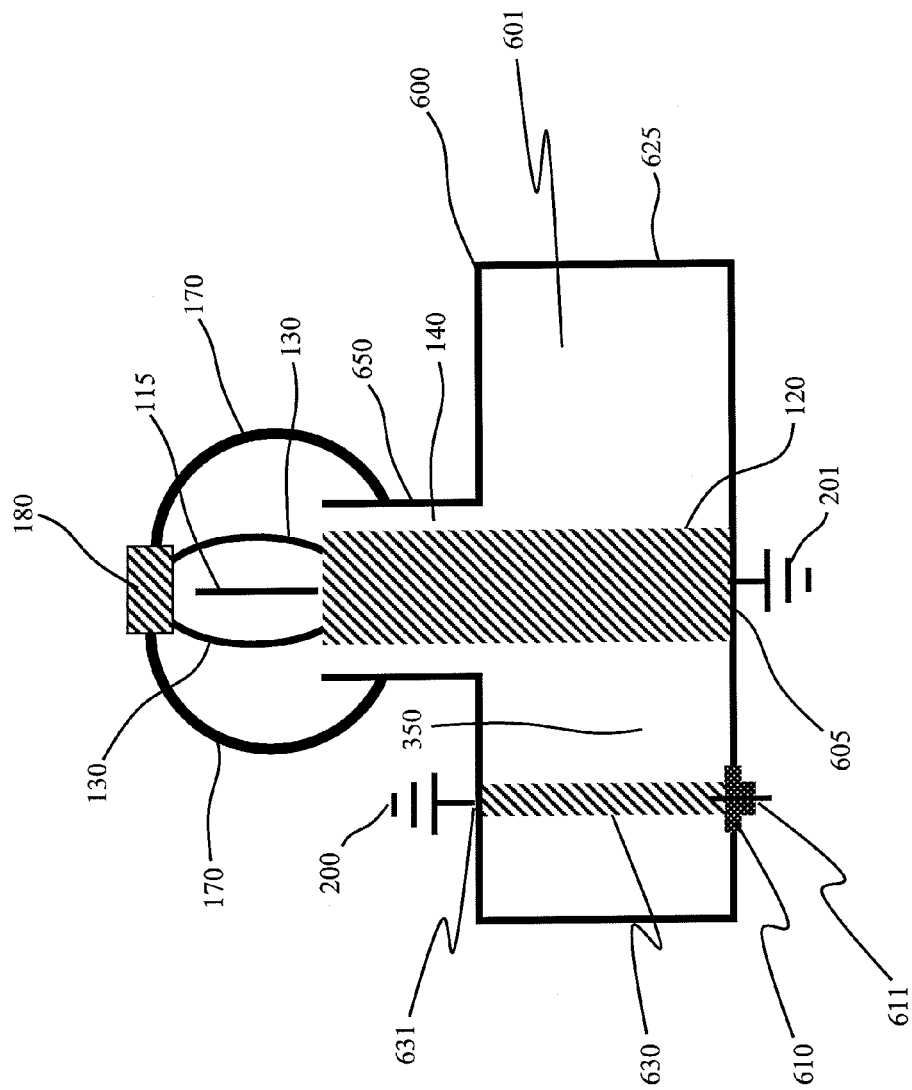
FIG. 4D shows another embodiment of the invention shown in FIG. 4A. In this embodiment the top of the gas filled vessel (bulb) is electrically connected to the lamp body via wires or straps and a top coupling element.

FIG. 4D shows another embodiment of the present invention. The lamp is similar to FIG. 4A except that the top of the gas filled vessel (bulb) is electrically connected to the lamp body 600 (which is at ground potential) through a top post 180 and wires or straps 170. The post 180 can be made from a solid conductor or it can be made from a dielectric material with a conductive coating. In the case that it is made from a solid conductor a thin layer of dielectric material or refractory material can be used as a barrier between the post and the bulb. This diagram is merely an example, which should not unduly limit the scope of the claims herein. One of ordinary skill in the art would recognize other variations, alternatives, and modifications.

Figure 4E:
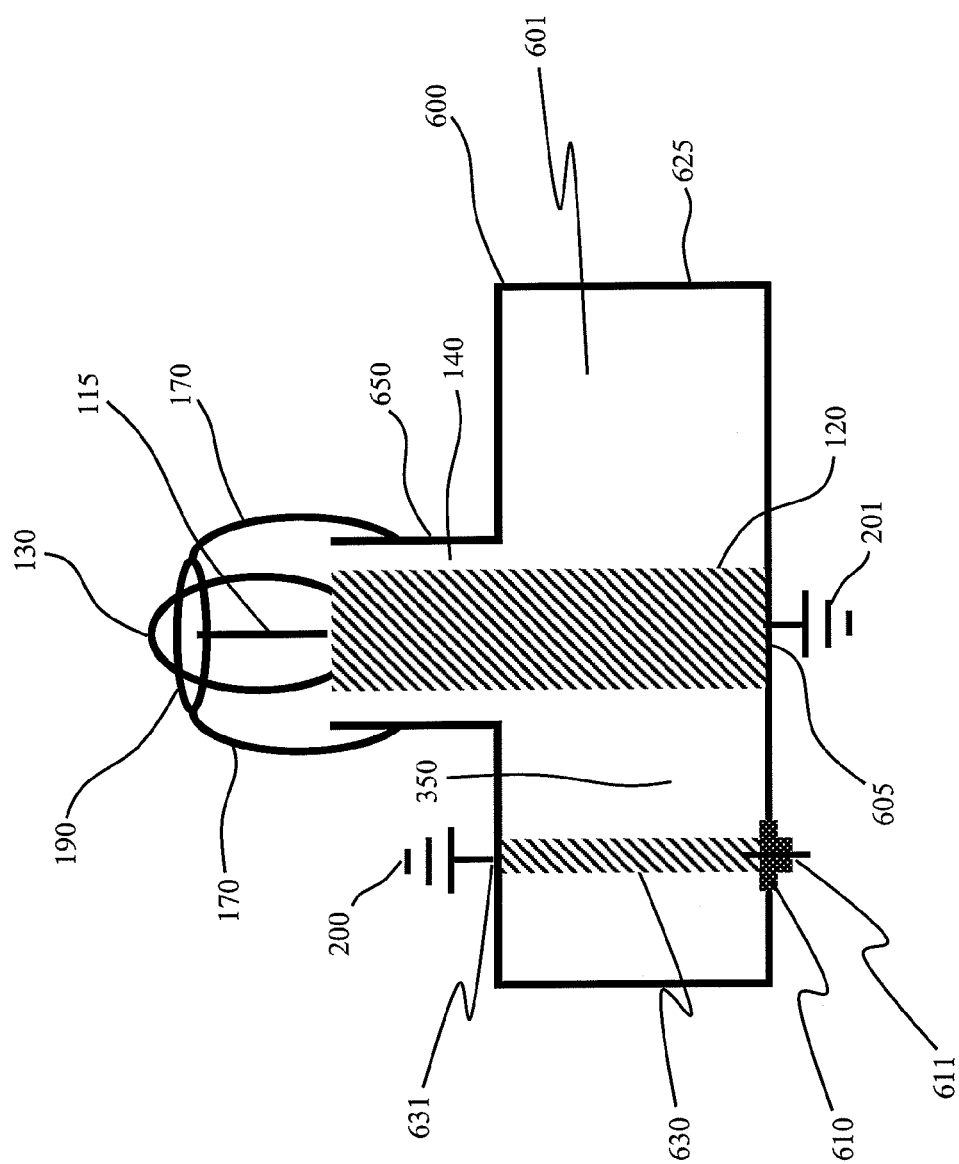
FIG. 4E shows another embodiment of the invention shown in FIG. 4D. In this embodiment an electrically conductive ring ("halo") is used along the length of the gas filled vessel (bulb) to give additional control over the plasma (arc) inside the bulb. This electrically conductive ring is connected to the lamp body via wires or straps.

FIG. 4E shows another embodiment of the present invention. The lamp is similar to FIG. 4D except instead of a solid top post 180 an electrically conductive ring 190 ("halo") is used that is connected to the lamp body 600 (which is at ground potential) by wires or straps 170. The conductive ring can be made from metals such as Copper or Aluminum or refractory metals such as Molybdenum or Tungsten. Compared to the solid top post 180 the "halo" 190 blocks less of the light from the bulb and it can be positioned at any point along the length of the bulb to maximize light output. The "halo" can also be used to control the position of the arc within the bulb or achieve more concentrated light from a section of the arc. The "halo" can be in contact with the surface of the bulb or it can be separated from the bulb by air or a dielectric material. A circular metal ring 190 is depicted, but other shapes may be used. As shown, the ring or ring like structure is substantially free from any contact with the bulb and is generally separated by a gap according to a specific embodiment. In a specific embodiment, the ring or ring like structure may also be configured with a dielectric layer (e.g., quartz, alumina), which is thin, between the ring or ring like structure and the bulb. Of course, there can be other variations, modifications, and alternatives.

Figure 4F:
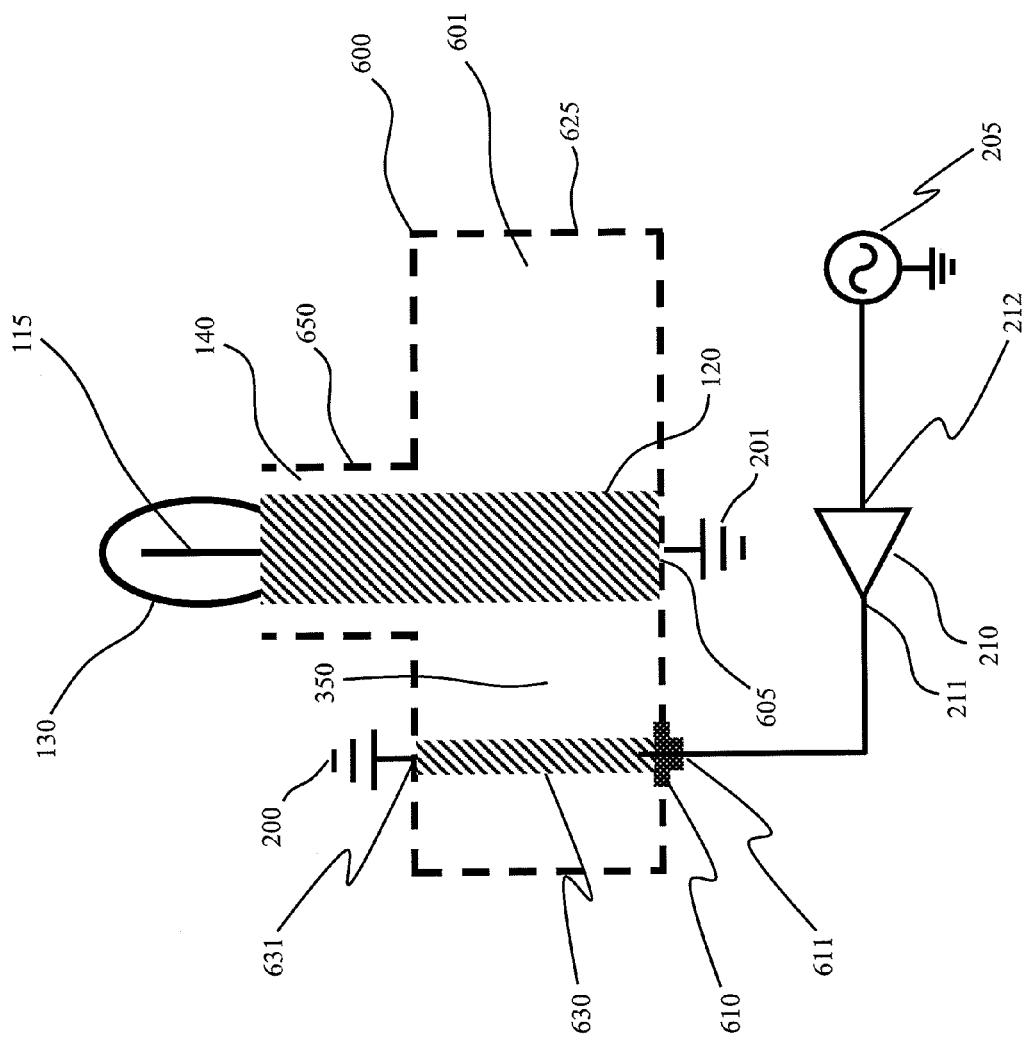
FIG. 4F shows another embodiment of the present invention. It is similar to the embodiment in FIG. 4A but in this case the lamp body does not necessarily have rectangular edges and can take other forms to contain the input and output coupling elements.

FIG. 4F shows another embodiment of the present invention. It is similar to the embodiment in FIG. 4A but in this case the lamp body 600, which surrounds the input coupling element 630 and output coupling element 120, does not necessarily have a cylindrical shape and can take other forms. The lamp body is filled with air 601 or other gases/fluids or it can also be a vacuum.

Figure 5A:
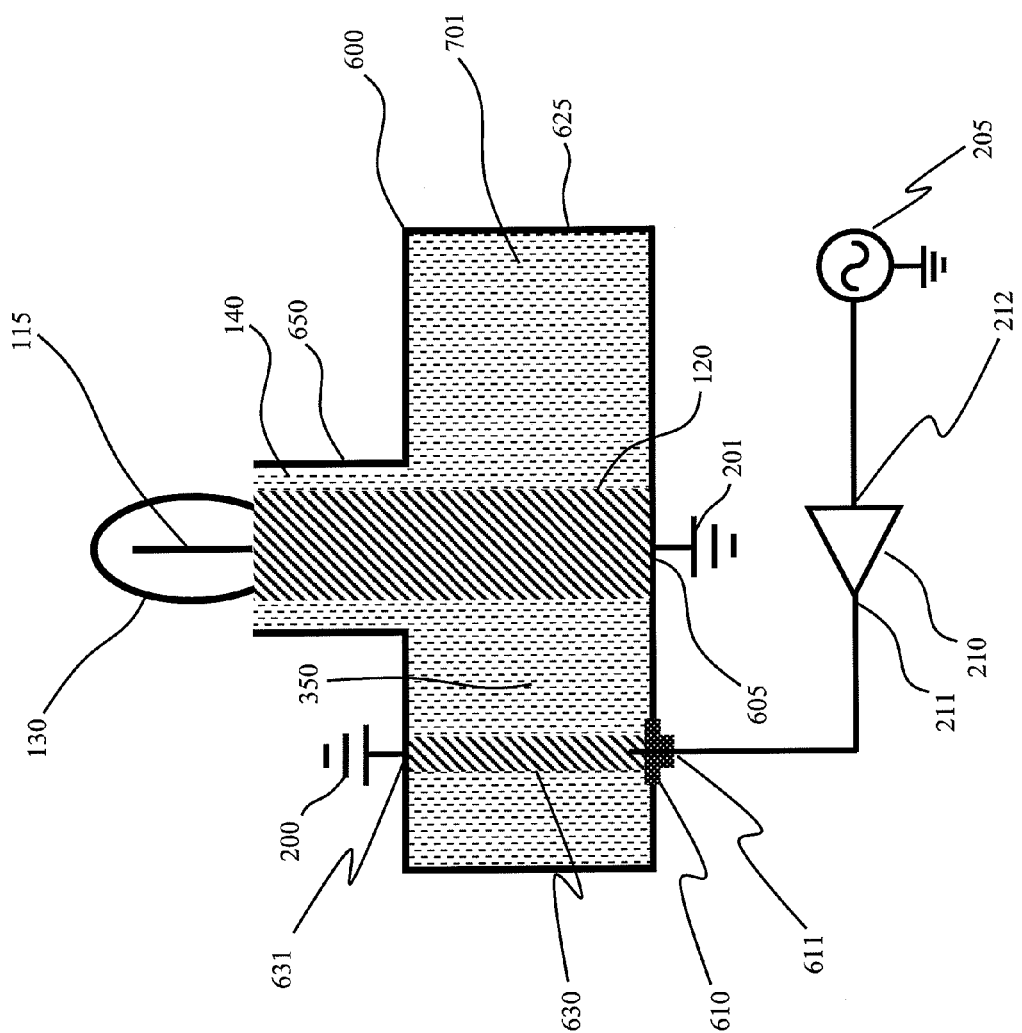
FIG. 5A shows another embodiment of the present invention. It is similar to the embodiment in FIG. 4A but in this case the lamp body is filled with a dielectric material such as alumina or quartz instead of air.

FIG. 5A shows another embodiment of the present invention. It is similar to the embodiment in FIG. 4A but in this case the lamp body 600 is filled with a dielectric material 701 with a dielectric constant greater than 1 such as alumina or quartz instead of air (or vacuum) 601. The dielectric material has preferably low RF losses. The lamp body is depicted that is completely filled with dielectric but is it possible to have a partially filled lamp body. Similar to FIG. 4A most of the arc 115 of the bulb 130 is not surrounded by the lamp body.

Figure 5B:
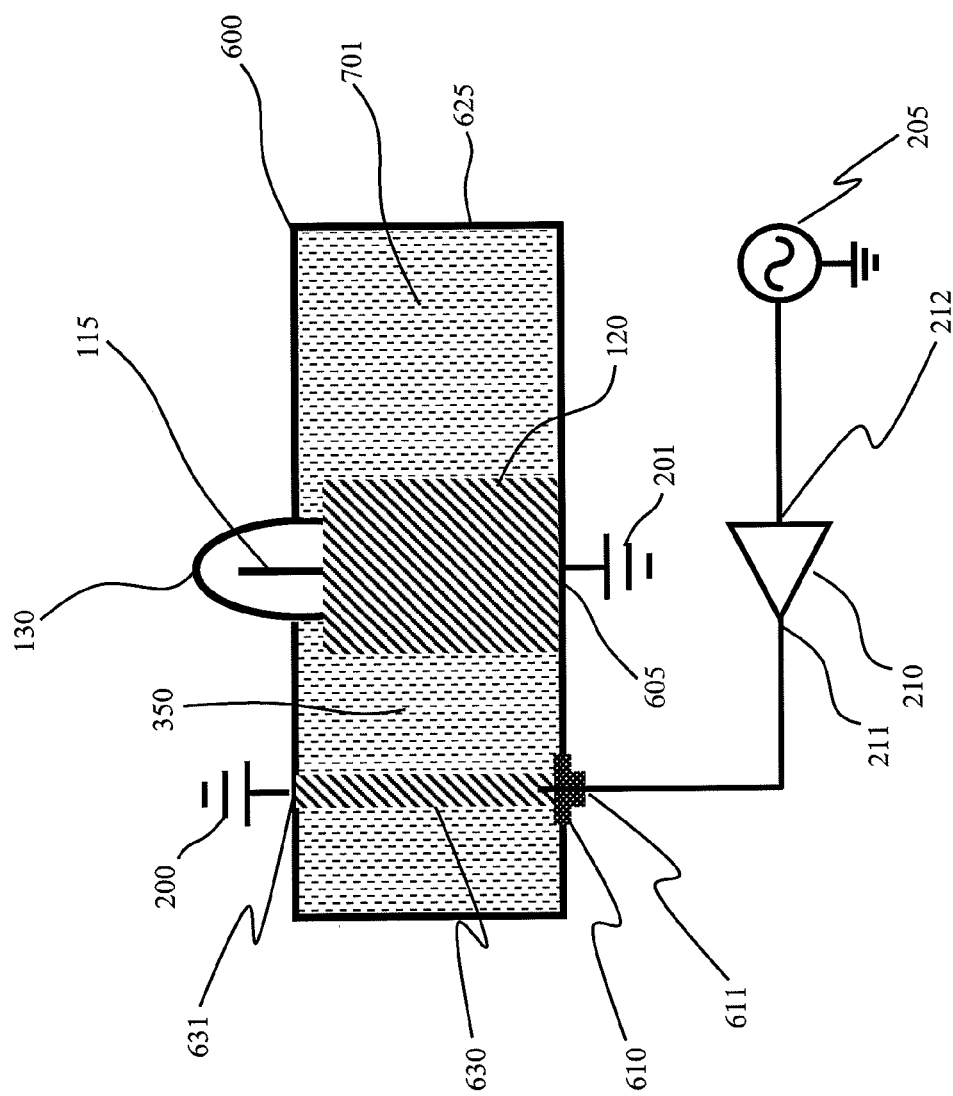
FIG. 5B shows another embodiment of the present invention. It is similar to the embodiment in FIG. 5A but in this case the lamp body does not have a "neck" region and part of the arc of the gas filled vessel (bulb) is inserted into dielectric material.

FIG. 5B shows another embodiment of the present invention. It is similar to the embodiment in FIG. 5A but in this case the lamp body does not have a "neck" region 650 and part of the gas filled vessel (bulb) 130 is inserted into dielectric material 701 inside the lamp body 600. As a result the arc 115 inside the bulb is at least partially surrounded by the lamp body. By using an optically reflective dielectric coating on surfaces of the bulb inside the lamp body or surrounding those surfaces by a reflective dielectric powder such as alumina powder it is possible to recover part of the light lost inside the lamp body. Similar to FIG. 5A the input coupling element 630 is connected to an RF source at one end and to the conductive surface 631 of the lamp body at the other end which is at ground potential 200. This diagram is merely an example, which should not unduly limit the scope of the claims herein. One of ordinary skill in the art would recognize other variations, alternatives, and modifications.

Figure 5C:
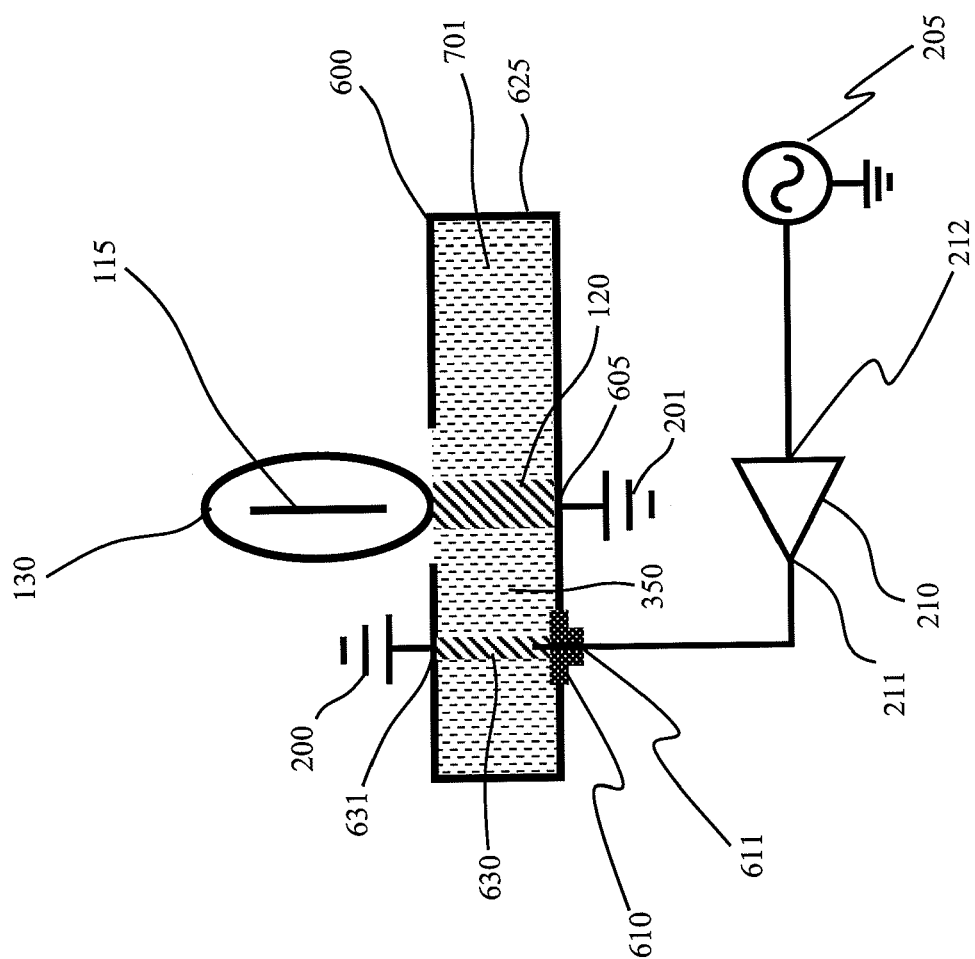
FIG. 5C shows another embodiment of the present invention. It is similar to the embodiment in FIG. 5B but in this case the bulb is outside the dielectric material of the lamp body and the arc of the gas filled vessel (bulb) is not surrounded by the lamp body. The size of the lamp body can be made to be much more compact.

FIG. 5C shows another embodiment of the present invention. It is similar to the embodiment in FIG. 5B but in this embodiment the bulb 130 is outside the dielectric material 701 of the lamp body 600 and the arc 115 of the bulb is not surrounded by the lamp body. Similar to FIG. 5A the input coupling element 630 is electrically connected to an RF source at one end through the RF connector 611 and to the conductive surface 631 of the lamp body at the other end which is at ground potential 200. The output coupling element 120 is electrically connected to the conductive surface 605 of the lamp body at one end which is at ground potential 201, and connected to the bulb 130 at the other end. Using this embodiment it is possible to make the lamp body to be much more compact.

Figure 5D:
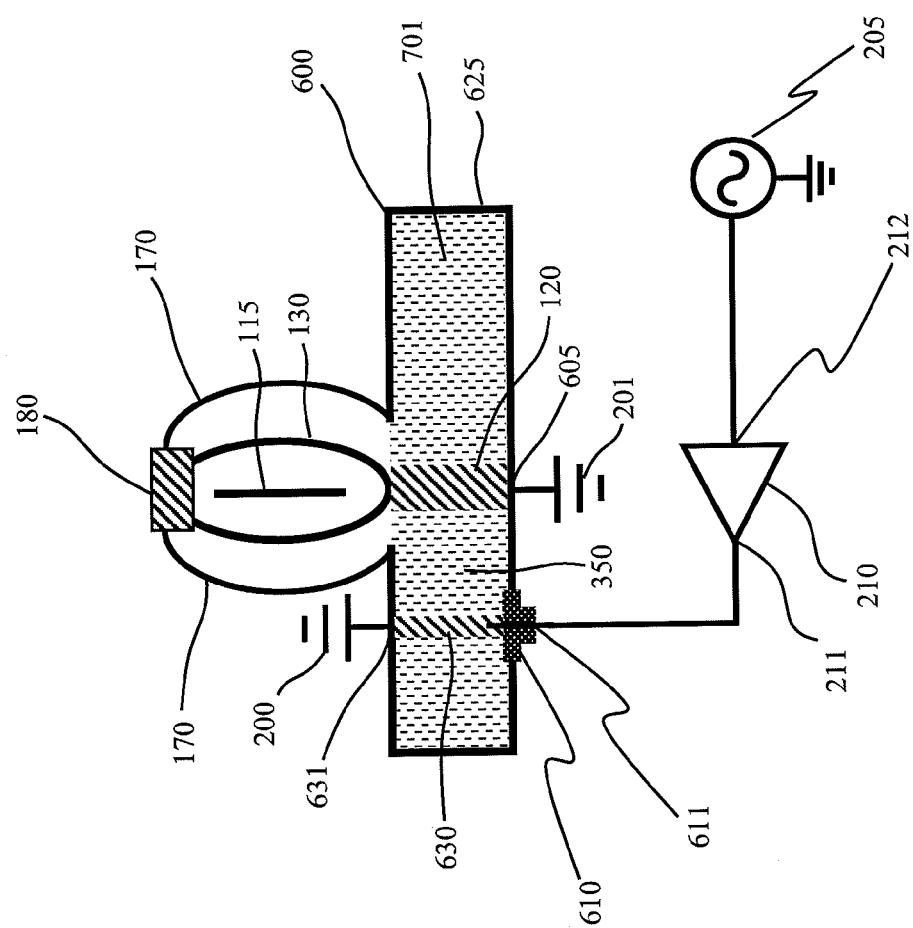
FIG. 5D shows another embodiment of the invention shown in FIG. 5C. In this embodiment the top of the gas filled vessel (bulb) is electrically connected to the lamp body via wires or straps and a top coupling element.

FIG. 5D shows another embodiment of the present invention. The lamp is similar to FIG. 5C except that the top of the gas filled vessel (bulb) is electrically connected to the lamp body 600 (which is at ground potential) through a top post 180 and wires or straps 170. The post 180 can be made from a solid conductor or it can be made from a dielectric material with a conductive coating. In the case that it is made from a solid conductor a thin layer of dielectric material or refractory material can be used as a barrier between the post and the bulb. This diagram is merely an example, which should not unduly limit the scope of the claims herein. One of ordinary skill in the art would recognize other variations, alternatives, and modifications.

Figure 5E:
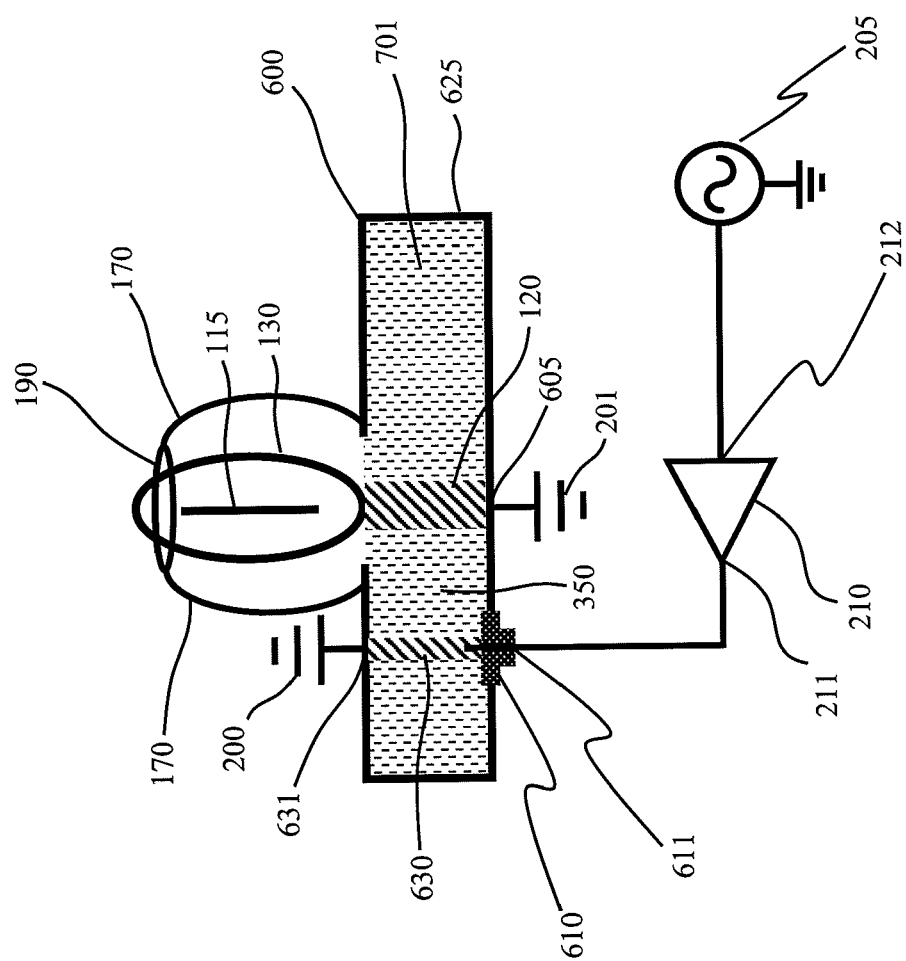
FIG. 5E shows another embodiment of the invention shown in FIG. 5C. In this embodiment an electrically conductive ring ("halo") is used along the length of the gas filled vessel (bulb) to give additional control over the plasma (arc) inside the bulb. This electrically conductive ring is connected to the lamp body via wires or straps.

FIG. 5E shows another embodiment of the present invention. The lamp is similar to FIG. 5D except instead of a solid top post 180 an electrically conductive ring 190 ("halo") is used that is connected to lamp body 600 (which is at ground potential) by wires or straps 170. The conductive ring can be made from metals such as Copper or Aluminum or refractory metals such as Molybdenum or Tungsten. Compared to the solid top post 180 the "halo" 190 blocks less of the light from the bulb and it can be positioned at any point along the length of the bulb to maximize light output. The "halo" can also be used to control the position of the arc within the bulb or achieve more concentrated light from a section of the arc. The "halo" can be in contact with the surface of the bulb or it can be separated from the bulb by air or a dielectric material. A circular metal ring 190 is depicted, but other shapes may be used.

Figure 5F:
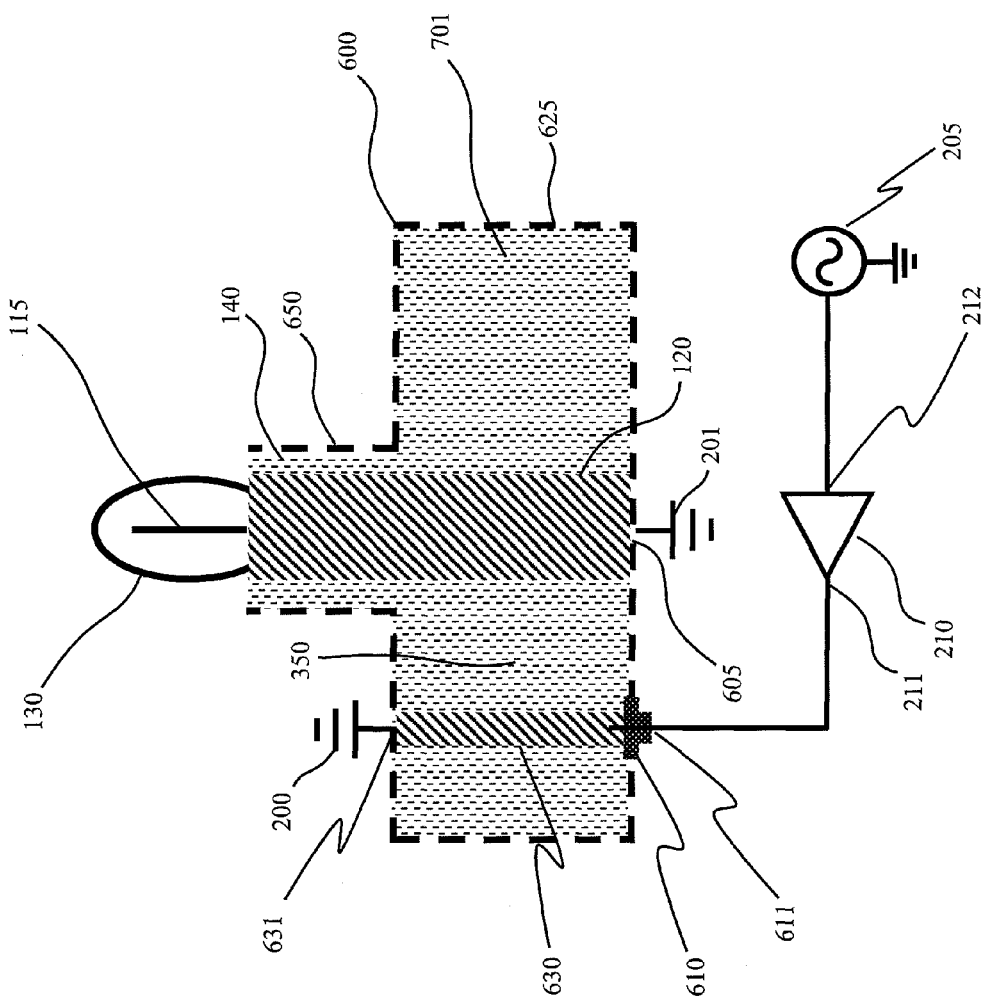
FIG. 5F shows another embodiment of the present invention. It is similar to the embodiment in FIG. 5A but in this case the lamp body does not necessarily have rectangular edges and can take other forms to contain the input and output coupling elements.

FIG. 5F shows another embodiment of the present invention. It is similar to the embodiment in FIG. 5A but in this case the lamp body 600, which surrounds the input coupling element 630 and output coupling element 120, does not necessarily have a cylindrical shape and can take other forms. The lamp body is completely or partially filled with a dielectric material 701 with a dielectric constant greater than 1.

Figure 6A:
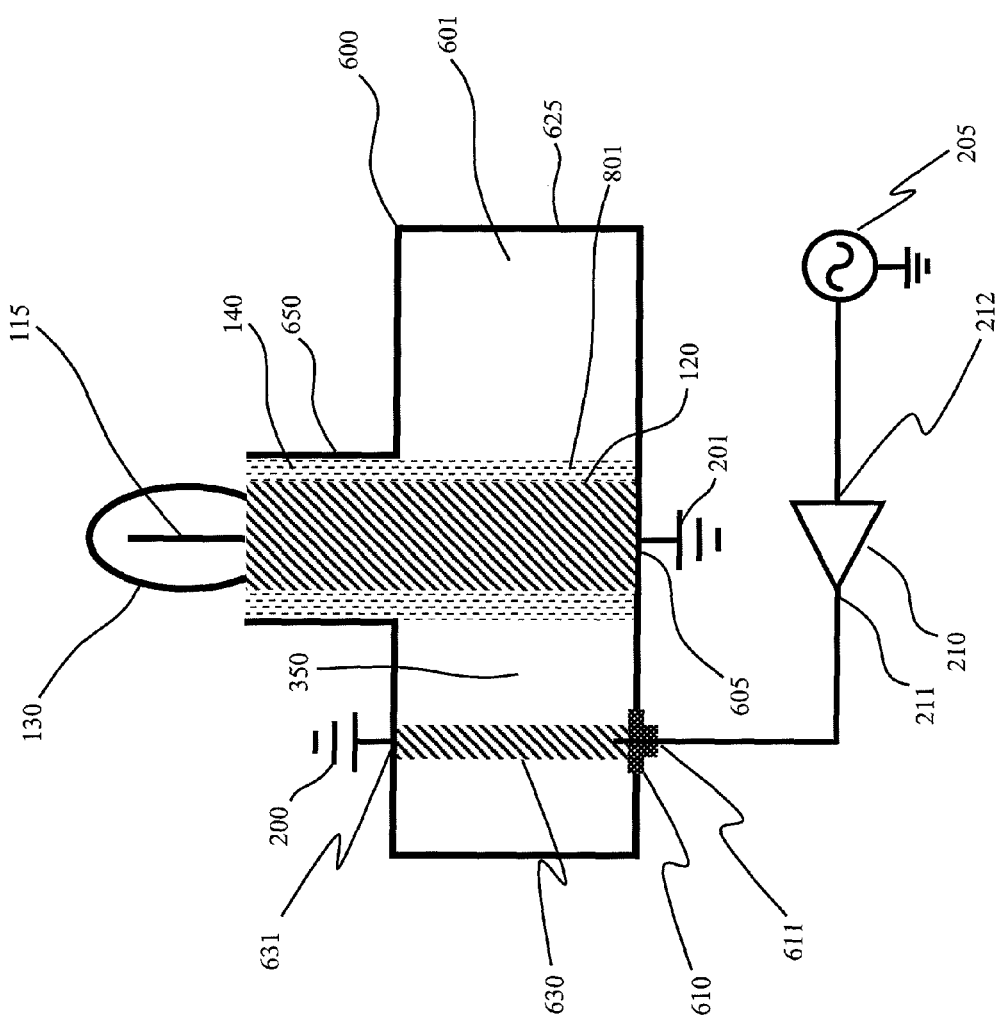
FIG. 6A shows another embodiment of the present invention. It is similar to the embodiment in FIG. 4A but in this case the output coupling element is surrounded by a dielectric sleeve made from a material such as quartz.

FIG. 6A shows another embodiment of the present invention. It is similar to the embodiment in FIG. 4A except that in this case the output coupling element 120 is surrounded by a dielectric sleeve 801 made from a material such as quartz. The dielectric sleeve increases the capacitance in the gap 140 between the output coupling element 120 and the top section of the lamp body 650 resulting in lowering the resonant frequency of the lamp body. This diagram is merely an example, which should not unduly limit the scope of the claims herein. One of ordinary skill in the art would recognize other variations, alternatives, and modifications.

Figure 6B:
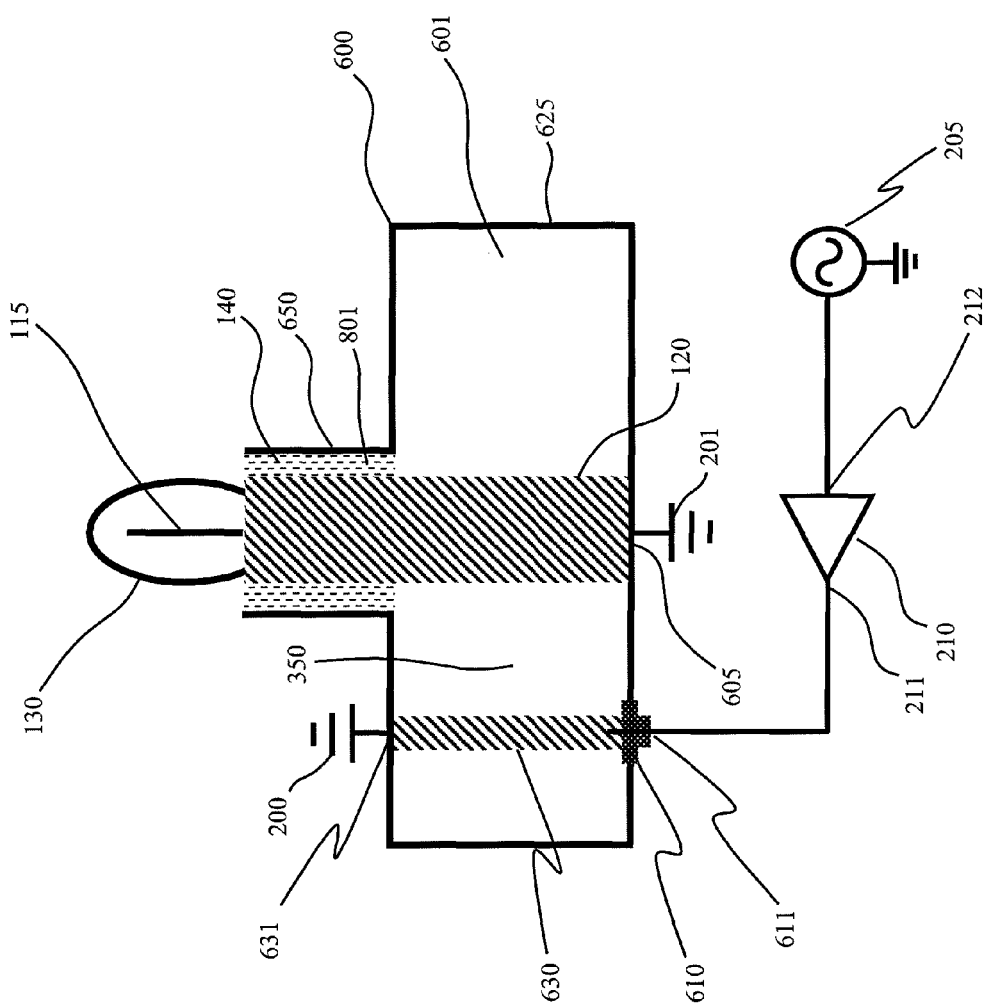
FIG. 6B shows another embodiment of the present invention. It is similar to the embodiment in FIG. 6A but in this case a dielectric sleeve made from a material such as quartz surrounds the output coupling element only in the top portion (neck portion) of the lamp body.

FIG. 6B shows another embodiment of the present invention. It is similar to the embodiment in FIG. 6A but in this case a dielectric sleeve 801 surrounds the output coupling element 120, only in the top portion (neck portion) 650 of the lamp body 600.

While the above is a full description of the specific embodiments, various modifications, alternative constructions and equivalents may be used. Therefore, the above description and illustrations should not be taken as limiting the scope of the present invention which is defined by the appended claims.

What is claimed is:
1. An electrodeless plasma lamp apparatus comprising:
an input coupling element, the input coupling element having a first input end, a second input end, and an input length provided between the first input end and the second input end;
an RF source coupled to the first input end of the input coupling element;
a first ground potential coupled to the second input end of the input coupling element;

an output coupling element spatially disposed within a vicinity of the input coupling element, the output coupling element comprising a first output end, a second output end, and an output length provided between the first output end and the second output end;

a spatial distance configured between the input length and the output length;

a dielectric fill material or materials configured to enclose one or more portions of the input coupling element, the output coupling element, and the spatial distance between the input coupling element and the output coupling element; and a bulb device coupled to the first output end of the output coupling element.

2. The apparatus of claim 1 wherein the dielectric fill material comprises at least one material selected from alumina, silicon dioxide, silicon nitride, or quartz.

3. The apparatus of claim 1 wherein the dielectric fill material is configured partially around one or more portions of the bulb device.

4. An electrodeless plasma lamp apparatus comprising:

an input coupling element, the input coupling element having a first input end, a second input end, and an input length provided between the first input end and the second input end;

an RF source coupled to the first input end of the input coupling element;

a first ground potential coupled to the second input end of the input coupling element;

an output coupling element spatially disposed within a vicinity of the input coupling element, the output coupling element comprising a first output end, a second output end, and an output length provided between the first output end and the second output end;

a spatial distance configured between the input length and the output length;

a dielectric fill material or materials configured to enclose one or more portions of the input coupling element, the output coupling element, and the spatial distance between the input coupling element and the output coupling element;

a bulb device coupled to the first output end of the output coupling element; and a second ground potential coupled to the second output end of the output coupling element.

5. The apparatus of claim 4 wherein the first ground potential and the second ground potential is the same ground potential.

6. The apparatus of claim 4 wherein the spatial distance separates the input coupling element from the output coupling element.

7. The apparatus of claim 4 wherein the input coupling element and the output coupling element are configured in a parallel arrangement.

8. The apparatus of claim 4 wherein the RF source comprises an oscillator and one or more amplifiers.

9. The apparatus of claim 4 further comprising a second capacitor configured between the second ground potential and the second output end of the output coupling element.

10. The apparatus of claim 4 further comprising a second inductive coil device configured between the second ground potential and the second output end of the output coupling element.

11. The apparatus of claim 4 further comprising a second inductive coil device and a second capacitor device configured between the second ground potential and the second output end of the output coupling element.

12. The apparatus of claim 4 wherein the dielectric fill material comprises alumina or quartz or silicon nitride.

13. The apparatus of claim 4 wherein the dielectric fill material comprises at least silicon dioxide or quartz.

14. The apparatus of claim 4 wherein the dielectric fill material is characterized by a loss tangent of 0.01 and less.

15. The apparatus of claim 4 further comprising a first capacitor configured between the first ground potential and the second input end of the input coupling element.

16. The apparatus of claim 15 further comprising a second capacitor configured between the second ground potential and the second output end of the output coupling element.

17. The apparatus of claim 4 further comprising a first inductive coil device configured between the first ground potential and the first input end of the input coupling element.

18. The apparatus of claim 17 further comprising a second inductive coil device configured between the second ground potential and the second output end of the output coupling element.

19. The apparatus of claim 4 further comprising a first inductive coil device and a first capacitor device configured between the first ground potential and the first input end of the input coupling element.

20. The apparatus of claim 19 further comprising a second inductive coil device and a second capacitor device configured between the second ground potential and the second output end of the output coupling element.

* * * * *